July 9, 1957  J. F. CARNEY  2,798,517
CHAIN SAW

Filed Dec. 23, 1954  2 Sheets-Sheet 1

INVENTOR.
JOHN F. CARNEY
BY
McMorrow, Berman & Davidson
ATTORNEYS

July 9, 1957  J. F. CARNEY  2,798,517
CHAIN SAW
Filed Dec. 23, 1954  2 Sheets-Sheet 2
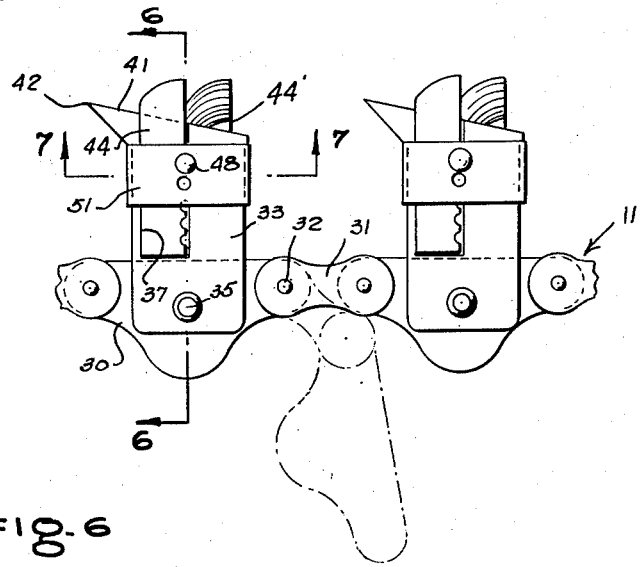
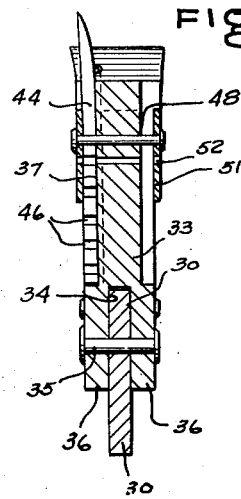
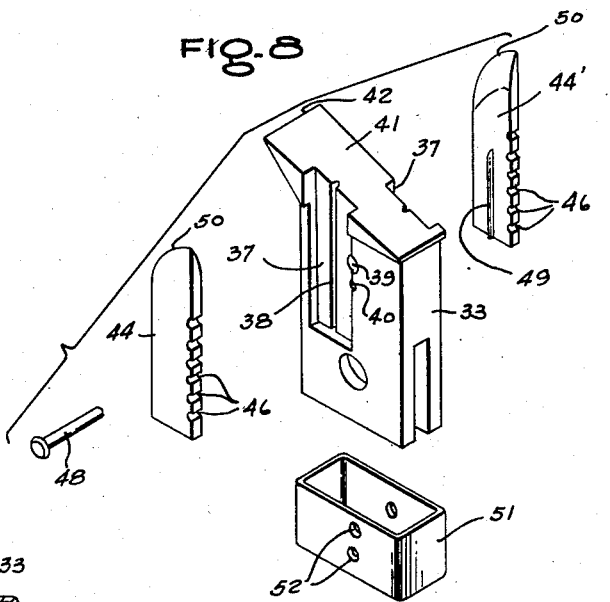
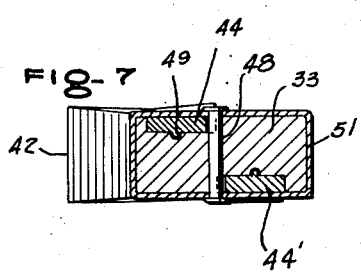
INVENTOR.
JOHN F. CARNEY
BY
McMorrow, Berman + Davidson
ATTORNEYS

United States Patent Office 2,798,517
Patented July 9, 1957

2,798,517

CHAIN SAW

John F. Carney, Mars Hill, Maine

Application December 23, 1954, Serial No. 477,226

2 Claims. (Cl. 143—135)

This invention relates to a power driven cutting tool, and more particularly to a cutting tool having an outline structural shape which provides a smoother cutting action and which provides a faster cutting action than has been available for cutting certain types of material prior to this time.

A main object of the invention is to provide a novel and improved cutting tool which is simple in construction, which provides a smooth cutting action, and which provides a faster cutting action than available with hitherto known cutting tools.

A further object of the invention is to provide an improved cutting tool which has an improved configuration, the improved cutting tool being inexpensive to construct, being durable, being easy to sharpen, and providing a clean and smooth cut.

A still further object of the invention is to provide an improved tooth construction for a chain saw, or for a similar saw, the improved tooth including adjustable cutting blade elements which may be elevated as their cutting edges are worn and which may be resharpened easily, whereby the saw may be readily repaired instead of being discarded, as in the case of saws having non-replaceable or non-adjustable cutting blade elements such as are used in the prior art.

Further objects and advantages of the invention will become apparent from the following description and claims, and from the accompanying drawings, wherein:

Figure 5 is a fragmentary side elevational view of a portion of a chain saw provided with adjustable and replaceable cutting blade elements, in accordance with the present invention.

Figure 6 is an enlarged vertical cross sectional view taken on the line 6—6 of Figure 5.

Figure 7 is an enlarged horizontal cross sectional view taken on the line 7—7 of Figure 5.

Figure 8 is a perspective view showing the components of the cutting teeth of the chain saw assembly of Figure 5.

Figure 1:
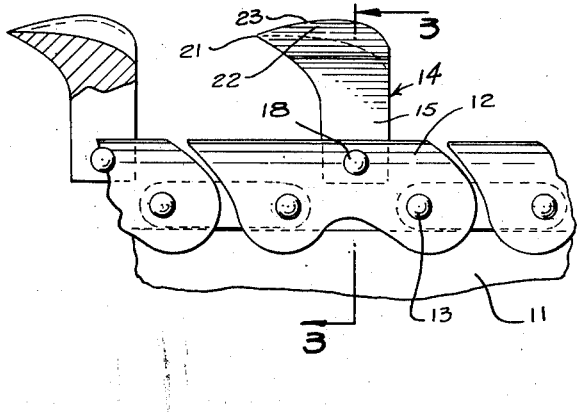
Figure 1 is a fragmentary side elevational view, partly in vertical cross section, of a portion of a chain saw constructed in accordance with the present invention.

Referring to the drawings, and more particularly to Figures 1 to 4, 11 designates the chain of a conventional chain saw, said chain being provided with the tooth-supporting elements 12 which are suitably articulated, as by link connections at 13. Secured to each articulation 12 is a saw tooth 14, each saw tooth comprising a main body 15 having a reduced lower end 16 adapted to be engaged in a slot 17 in the associated articulation 12 and to be secured to the member 12 by a transverse rivet 18 extending through the member 12 and through an aperture 19 formed in the reduced end portion 16 of the tooth 14.

Figure 3:
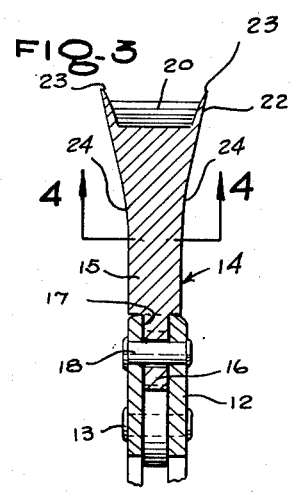
Figure 3 is an enlarged vertical cross sectional view taken on the line 3—3 of Figure 1.

The upper portion of the main body 15 is formed with a forwardly projecting cutter or tooth element 19, said tooth element 19 comprising an intermediate cutting blade element 20 having a horizontal cutting edge 21, and respective upstanding generally triangular longitudinally extending cutting blade elements 22, 22 on the opposite sides of the main body, the longitudinally extending blade elements 22, 22 being upwardly divergent, as is clearly shown in Figure 3 and having arcuate top cutting edges 23, 23 which extend above the level of the cutting edge 21 of the horizontal blade element 20.

Figure 2:
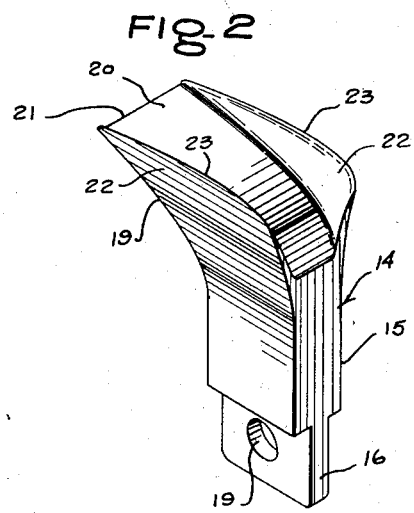
Figure 2 is a perspective view of an improved chain saw tooth according to the present invention, as employed in Figure 1.
Figure 4:
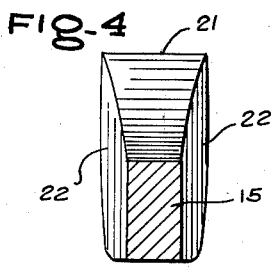
Figure 4 is a cross sectional view taken on the line 4—4 of Figure 3.

As is clearly shown in Figures 2 and 3, the longitudinal blade elements 22, 22, taper upwardly in thickness, and the top surface of the intermediate blade element 20 is downwardly and rearwardly inclined between the longitudinal blade elements 22, 22, said top surface being preferably convex and being arcuately curved downwardly and rearwardly from the transverse cutting edge 21 to the rear surface of the tooth 14.

As is clearly shown in Figure 3, by virtue of the upward divergence of the longitudinal blade elements 22, 22, the sides of the tooth 14 are concave, as shown at 24, 24, providing the cutting clearance at the sides of the tooth which is necessary for free cutting action.

As will be apparent from Figure 2, the transverse cutting edge 21 provides a planing action which cooperates with the cutting action of the longitudinal blades 22, 22 to provide an exceptionally clean and smooth cut.

As will be further apparent from Figure 2, the cutting edges of the improved saw tooth 14 may be readily sharpened, since easy access is obtained to the inside portions of the cutting edges, as well as to the outside portions thereof, whereby said edges may be easily dressed by means of a suitable sharpening tool.

While the cutting tool above described and illustrated in Figures 1 to 4 is adapted for use in connection with a chain saw which operates either in a horizontal or vertical plane, it would be equally effective in other tools, for example, in a rotary circular saw. The cutting tool may be attached to the driven element of the device on which it is employed in any suitable manner, employing any well known means.

In cutting tools employed prior to the present invention, the contours and shapes used have been such that they are difficult to form and are difficult to maintain sharp. In the cutting tool of the present invention, the shape of the tool is relatively simple, whereby the tool is inexpensive to construct, and the various faces and edges of the tool are easily accessible for sharpening.

Referring now to the modification of the invention illustrated in Figures 5 to 8, the chain saw, designated generally at 11' may comprise a plurality of main link members 30 which are connected at their end portions by respective pairs of connecting links 31 disposed on the opposite sides of the main links 30 and connected thereto by transverse link pins 32. Each saw tooth comprises a main body 33 formed with a bottom groove 34 which receives the upper intermediate portion of a main link 30, the main toothed body 33 being secured to the main link 30 by a transverse rivet 35.

As shown in Figure 6, the transverse rivet 35 extends through the depending bottom lower elements 36, 36 of the main body 33 and through the intervening main link 30 to rigidly secure the toothed body 33 on the link 30.

The upper portion of the main body 33 is formed on its opposite sides with vertical recesses, as viewed in Figures 6 and 8, said recesses being shown at 37, each recess being formed on its inner wall surface with a vertical groove 38 and being further formed with the transverse, vertically spaced apertures 39 and 40 extending through respective vertical edges of the vertical recesses 37. The top of the toothed body 33 is formed with the inclined planing surface 41, terminating in the transverse cutting edge 42. As is clearly shown in Figure 8, the recesses 37 are offset with respect to each other on the opposite sides of the body 33, one of the recesses being located forwardly and the other recess being located rearwardly, the transverse apertures 39 and 40 passing through the rear edge of the recess 37 on one side of the tooth and passing through the forward vertical edge of the recess on the opposite side of the tooth.

Adjustably disposed in the respective recesses 37 are the upstanding cutting tooth elements 44, 44', the cutting tooth element 44 being receivable in the recess 37 on one side of the toothed body 33, for example, the forwardly arranged recess 37, and the cutting tooth element 44' being receivable in the recess 37 on the opposite side of the toothed body, namely, the rearward recess. The tooth elements 44 and 44' are provided on their vertical edges with vertically spaced notches 46 which are respectively registrable with the transverse apertures 39, 40 in different adjusted positions of the tooth elements 44, 44', the spacing between the notches 46 being different from the spacing between the transverse apertures 39 and 40, to provide a wide range of adjustment wherein the notches 46 will register with one or the other of the transverse apertures 39, 40, to receive a transverse fastening rivet 48, shown in Figure 6, to secure the cutting tooth elements 44, 44' in selected positions in their recesses 37. The cutting tooth elements 44, 44' are provided on their inside faces with the vertical ribs 49 which are engageable in the grooves 38, whereby the cutting tooth elements will be securely locked and will be rigidly held in the recesses 37 after they have been fastened therein by the rivet 48.

As shown, the cutting tooth elements 44, 44' are provided on their top ends with the outwardly curved, arcuate cutting edges 50, the cutting edges 50 being inclined upwardly and outwardly in the same manner as the cutting edges 23, 23 of the previously described form of the invention.

Designated at 51 is a rectangular fastening band which is engaged over the tooth body 33 and over the shank portions of the cutting tooth elements 44, 44' seated in the recesses 37, the band 51 being formed with apertures 52 spaced in the same manner as the notches 46, whereby the securing rivet 48 may be passed through a selected transversely aligned pair of apertures 52, to thus secure the band 51 around the body 33 of the saw tooth in transversely overlapping relationship to the cutting tooth elements 44, 44'.

When the cutting tooth elements 44, 44' become worn or dull, or must be replaced, the cutting tooth elements 44, 44' may be removed, or may be elevated for resharpening, by first removing the transverse rivet 48. When the rivet 48 is removed, the cutting tooth elements 44, 44' may be replaced by new elements, and may be reset at desired elevations with respect to the main body 33, after which a new rivet 48 may be inserted through the apertures 52 of the band 51, through the notches 46 and through the aperture 39 or 40 of the toothed body 33, to secure the new cutting tooth elements to the body. Similarly, the original tooth elements may be resharpened and may be elevated to desired positions of adjustment by removing the transverse rivets 48, resetting the cutting tooth elements, and refastening the cutting tooth elements by means of a new rivet 48.

While certain specific embodiments of an improved cutting tool has been disclosed in the foregoing description, it will be understood that various modifications within the spirit of the invention may occur to those skilled in the art. Therefore, it is intended that no limitations be placed on the invention except as defined by the scope of the appended claims.

What is claimed is:

1. A cutting tool comprising a main body, a forwardly projecting tooth on said main body flaring upwardly in width and having concave opposite side surfaces, said tooth having a horizontal cutting blade element and being formed with longitudinally offset vertical recesses in its opposite side surfaces, and respective upstanding longitudinal cutting blade elements secured in said recesses at the opposite sides of said tooth, the top surface of said horizontal blade element being inclined downwardly and rearwardly between said longitudinal cutting blade elements.

2. A cutting tool comprising a main body, a forwardly projecting tooth on said main body flaring upwardly in width and having concave opposite side surfaces, said tooth having a horizontal cutting blade element, and being formed with longitudinally offset vertical recesses in its opposite side surfaces, respective upstanding longitudinal cutting blade elements positioned in said recesses, the top surface of said horizontal blade element being inclined downwardly and rearwardly between the top edges of said longitudinal cutting blade elements, and a transverse pin element extending through said main body and engaging the rear edge of one blade element and the front edge of the other blade element and securing said longitudinal cutting blade elements in selected positions in said recesses.

References Cited in the file of this patent

UNITED STATES PATENTS

| | | |
|---|---|---|
| 323,602 | Shipe | Aug. 4, 1885 |
| 834,251 | Bailey | Oct. 30, 1906 |
| 945,599 | Purser | Jan. 4, 1910 |
| 1,231,190 | Peterson | June 26, 1917 |
| 1,483,387 | Serin | Feb. 12, 1924 |
| 2,351,112 | Day | June 13, 1944 |
| 2,564,989 | Ohman | Aug. 21, 1951 |
| 2,583,243 | Tweedie | Jan. 22, 1952 |
| 2,664,120 | Hinkley | Dec. 29, 1953 |